Jan. 20, 1948.   J. J. HAGAN   2,434,846
PIPE COUPLING FOR FAUCET CONNECTIONS
Filed March 1, 1947
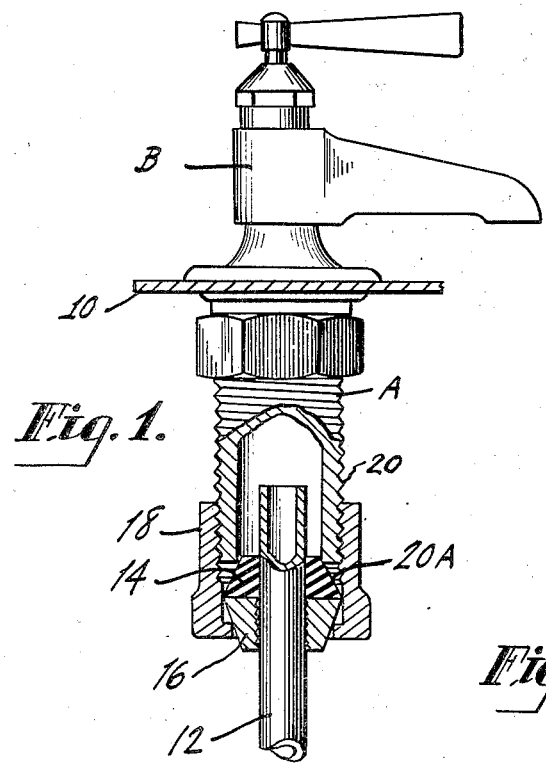
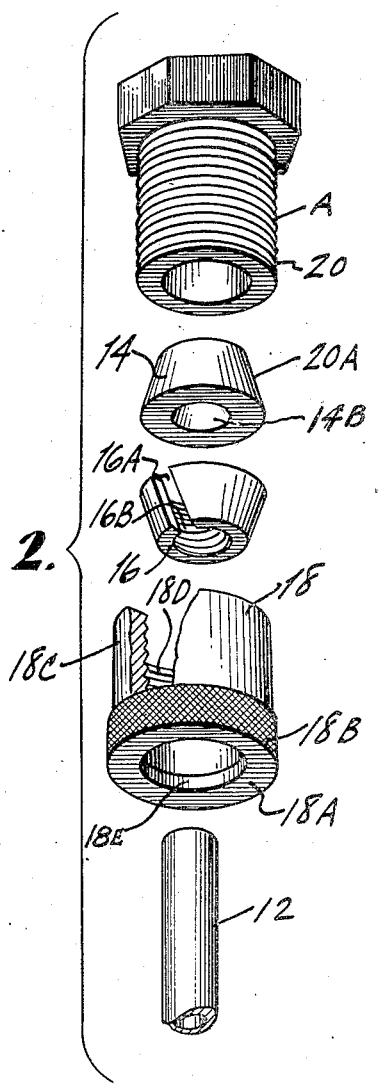
INVENTOR
JOHN J. HAGAN
BY
Harry Langsam
ATTORNEY Patented Jan. 20, 1948

2,434,846

UNITED STATES PATENT OFFICE 2,434,846

PIPE COUPLING FOR FAUCET CONNECTIONS

John J. Hagan, Philadelphia, Pa.

Application March 1, 1947, Serial No. 731,798

2 Claims. (Cl. 285—90)

My invention relates to pipe couplings, and relates particularly to devices for coupling domestic water supply lines to faucets.

This particular plumbing connection has long been a source of difficulty, since the inertia of the water when a faucet is turned off causes a severe jar and vibration known as "water hammer" in the neighborhood of the coupling. It has been customary to provide an external brace for the pipes at this point to reduce the shock to which the coupling is periodically subjected. Furthermore, if the connection is to be permanently leakproof, it must be free of strain, otherwise it is sure to fail. Accordingly, it has been necessary to cut and thread the supply line to an exact length corresponding to the fixture it is to reach. This is usually a cut and try process, with the attendant waste of time and material, and requires a measure of skill to accomplish. Since soft copper tubing is rapidly replacing the rigid steel pipe used to supply water, the need for a shock-proof connection at this point has become more important.

It is, therefore, an object of my invention to provide a pipe coupling by which pipes may be coupled together in a water-tight manner and in which the joint will be free of any strain.

Another object of my invention is to provide a pipe coupling whereby a supply pipe may be connected to a faucet nipple at any point along its length, so as not to require any precision or skill in its connection.

Another object of my invention is to provide a pipe coupling which requires only one of the pipe ends to be threaded.

Another object of my invention is to provide a coupling for faucets which is sufficiently strong to require no additional bracing or support.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a fragmentary cross section of a pipe coupling embodying my invention.

Fig. 2 is an exploded view of my coupling showing the separate elements of which it consists.

Referring now to the drawing wherein similar reference characters refer to similar parts, I show a water supply line, generally designated as 12, and a faucet to be connected thereto, generally designated as B. The faucet is supported upon a sink or basin 10, and has a short shank or pipe section A which is to be connected to the supply line 12.

The coupling itself consists of three separate elements: a tapered packing sleeve 14, a split steel cone 16, and a cap 18. The packing sleeve 14 has one end of a diameter slightly less than the inner diameter of the shank A, and its other end has a diameter equal to the inner diameter of the cap 18. The sleeve 14 has an axial bore 14B equal to the outer diameter of supply pipe 12, and serves as a water seal, being made of a compact material which will not deteriorate under the action of the fluid conveyed in the pipes. The split cone 16 is similar in size and shape to the sleeve 14, except that its bore 16B is internally threaded, and the cone is split as at 16A and widened slightly so that it can be slipped over the end of supply pipe 12. Cone 16 is made of tempered steel or any other metal having suitable hardness and flexibility, and serves to grip the smooth pipe 12. Although I show the cone 16 as preferably having an internally threaded bore, the cone bore 16B may alternatively be provided with any other serrated or roughened surface, or may even be left smooth. The cap 18 holds the pipes and the other coupling elements together. It consists of a bottom portion 18A having a hole 18E therein of a diameter equal to the mean diameter of the cone 16. The wall portion 18B of the cap immediately above the bottom is knurled to provide a gripping surface for the wrench used to tighten the coupling. Alternatively, this portion of the cap wall may be made with a polygonal exterior. The remainder of the cap wall 18C is provided with an internal thread 18D complementary to the externally threaded end 20 of the shank A.

To make a pipe connection with my coupling, the supply pipe 12 is cut roughly to a length where it can project inside the fixture shank A. The end 20 of shank A is threaded externally, and if desired a slight internal bevel (not shown) may be formed therein, using a taper reamer for the purpose. The cap 18, the split cone 16 and the sleeve 14 are assembled over the end of pipe 12 in the order shown, and the shank A is then brought over the end 12. The cap 18 is screwed upon the end 20 of the shank A, using a wrench to tighten it. The coupling functions as follows:

As the cap 18 is screwed upon the end 20, it forces the tapered sides 20A and the internal bore 14B of the packing sleeve 14 to wedge tightly between the inner edge or bevel of the shank end 20 and the exterior surface of pipe 12. When the sleeve 14 has entered the pipe A to an extent where the resistance met arrests any further inward movement, the force of the wrench turning the cap 18 is transmitted to the split steel cone 16 and by virtue of the inclined sides of the cone, tends to compress the cone about the pipe 12. The internal threads or serrations of the cone 16 now bite into the smooth walls of the pipe 12 and establish the mechanical rigidity or the connection whereby the pipe 12 cannot slip up or down with respect to the shank A. The fluid seal has already been established by the compressible sleeve 14 and the connection is complete.

Although my invention has been described in considerable detail, such description is intended as being illustrative rather than limiting, since the invention is to be determined as claimed.

I claim as my invention:

1. An adjustable pipe connector for connecting a pair of pipes, one of which has a threaded end, comprising a cap element adapted to screw upon said threaded end of one pipe, the top portion of said cap defining a central aperture, a compressible and tapered sleeve element adapted to partway enter said threaded end of said one pipe, and having a bore adapted to encircle the second of said pair of pipes, and a tapered and split element having a threaded bore, which bore is also adapted to encircle the second of said pair of pipes, and which sleeve has an end adapted to partway enter the aperture defined by the top of said cap.

2. A non-slip adjustable pipe connector comprising two lengths of pipe to be joined together, a flexible tapered sleeve surrounding one pipe and fitting into a second pipe to be coupled to said one pipe, a tapered compressing member abutting said flexible sleeve and surrounding the first pipe, a plurality of threads on the internal surface of said compressing member, and a cap threaded to one pipe and pressing said compressing member against said flexible sleeve.

JOHN J. HAGAN.